(No Model.)
L. H. MONTROSS.
MATCH MAKING MACHINE.
No. 525,791. Patented Sept. 11, 1894.
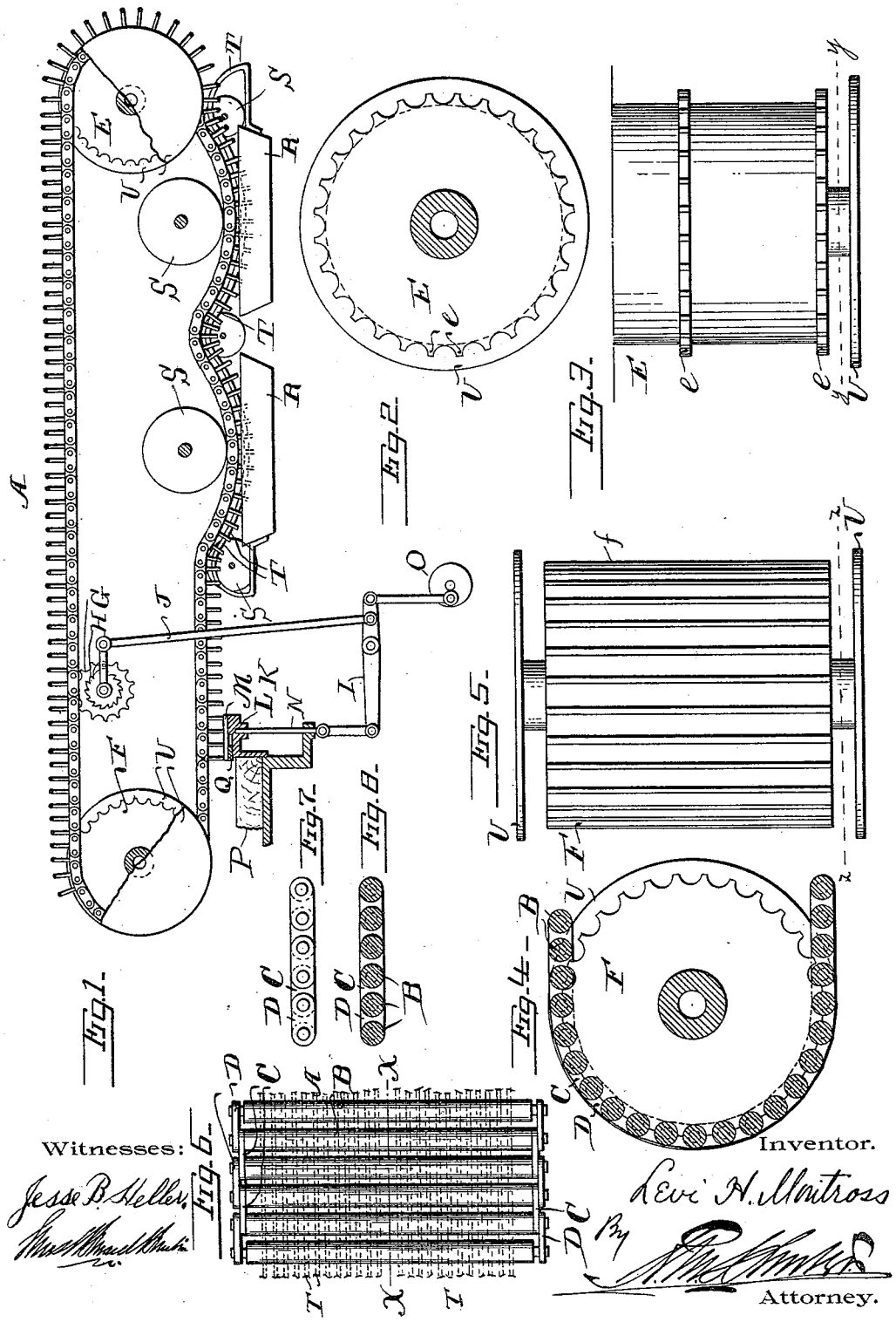
Witnesses:
Jesse B. Heller
Inventor.
Levi H. Montross
By
Attorney.
THE NORRIS PETERS CO., PHOTO-LITHO., WASHINGTON, D. C.

UNITED STATES PATENT OFFICE.

LEVI H. MONTROSS, OF CAMDEN, NEW JERSEY, ASSIGNOR OF THREE-FOURTHS TO ADOLPH SEGAL, OF PHILADELPHIA, PENNSYLVANIA.

MATCH-MAKING MACHINE.

SPECIFICATION forming part of Letters Patent No. 525,791, dated September 11, 1894.

Application filed November 13, 1893. Serial No. 490,743. (No model.)

*To all whom it may concern:*

Be it known that I, LEVI H. MONTROSS, of the city and county of Camden and State of New Jersey, have invented an Improvement in Match-Making Machines, of which the following is a specification.

My invention relates to match making machines and consists of certain improvements which are fully set forth in the following specification and are shown in the accompanying drawings, which form a part thereof.

More particularly my invention relates to that class of match making machines in which the splints are received in a moving conveyer by which they are conducted to the baths and from which they are discharged when dry.

A part of my invention relates to improvements in the construction of the conveyer whereby the operations of introducing the splints and discharging the matches are simplified and rendered more certain. In place of a conveyer formed of perforated plates or bars into the perforations of which the splints are introduced, I construct the conveyer of a series of independent parallel bars linked or joined together to form an apron or band, and introduce the splints into the interstices between adjacent bars. The conveyer thus constructed possesses greater flexibility and may be more easily driven. The introduction of the splints is also facilitated since they are introduced into a continuous space or opening and not each into a particular aperture. By making the bars tapered or round the guiding of the splints into the intervening spaces is facilitated.

My invention also embraces certain improvements in the devices for expelling the matches from the conveyer and devices for straightening and properly arranging the splints before they are dipped into the baths.

Referring to the drawings: Figure 1 is a side elevation of a match making machine embodying my improvements, only so much of the machine being shown as is necessary to explain the invention. Fig. 2 is a sectional side elevation of one of the conveyer guiding wheels on the line $y$—$y$ of Fig. 3. Fig. 3 is a plan view of the same. Fig. 4 is a sectional side elevation of another of the conveyer guiding wheels adapted for discharging the finished matches on the line 2—2 of Fig. 5. Fig. 5 is a plan view of the same. Fig. 6 is a plan view of a portion of the conveyer. Fig. 7 is a side elevation of the same. Fig. 8 is a longitudinal section of the same on the line $x$—$x$ of Fig. 6.

A is the conveyer which consists of a series of independent parallel transversely arranged bars B suitably linked together, as by the links C, D, to form an apron or belt. The conveyer may be supported and guided in any convenient manner, but preferably by sprocket drums or wheels E, F, the teeth $e$, $f$ of which engage the interstices between the bars B. One of these drums, as E, which acts merely as a guiding and supporting drum, is provided with sprocket teeth $e$ only at its outer edges and middle, the intermediate portions of the drum being denuded of teeth or the teeth being shortened. If desired the middle teeth $e$ may be omitted as they are useful only when a wide apron is employed to support the bars at the center, and the drum E may be void of sprocket teeth $e$ except at its outer edges. The other drum F is provided with sprocket teeth $f$ extending substantially entirely across the periphery of the drum, as these teeth serve the double purpose of supporting and guiding the apron and of expelling the matches. It is immaterial by what means the conveyer is driven, whether by either of the drums E, F or independent driving devices. For purposes of illustration I have shown an independent driving sprocket wheel G operated by a pawl and ratchet H, the latter being rocked by a lever I through a link J. By this means an intermittent movement is imparted to the conveyer.

K is a splint cutting apparatus which may be of any convenient construction such being well known in the art. In the drawings I have shown a reciprocating frame L carrying the cutters M and reciprocated vertically by means of suitable connections N from the lever I, the lever I being driven from an eccentric O. The cutters M in descending act upon the wooden board or block P and cut the splints therefrom, and in ascending carry the cut splints up to the apron or conveyer, the splints being supported at their lower ends by the base plate Q which is moved beneath the cutters after the downward movement has been completed to furnish a support for the lower ends of the splints when they are introduced into the conveyer. This form of cutting apparatus is well known in the art of match making. Other forms of cutting or splint making apparatus may be substituted for it.

R, R are the usual baths into which the ends of the splints are dipped to form the match heads. The conveyer or apron may have sufficient slackness as shown to permit it to sag as it passes over the baths and bring the heads of the splints in contact with the contents of the baths, the conveyer being guided to and from the baths by suitable guide wheels S, S.

T is a comb arranged in advance of the first bath S to straighten out the splints carried by the conveyor before they are dipped in the bath. This comb may extend rearwardly over the baths R, R as shown, so as to keep the splints straight during the dipping operation.

I shall now describe more fully the operation of the machine. The splints are cut, either in the manner described, or in any other convenient manner, and as the cutters rise carrying with them the series of cut splints, the ends of the splints are forced between two adjacent bars B, B of the apron A. Thus one of the interstices between the bars is provided with a row of splints which are firmly held between the bars. I prefer to employ round bars as shown as these offer the least resistance to the splints and serve to guide their ends into the intervening space. When the splints are inserted in between the bars the cutters descend and cut a new series of splints, the conveyer meanwhile moving along under the action of its feeding devices until the next pair of bars B are in position to receive the new series of splints in the manner already described. The movement of the conveyer is then arrested until the splints are received. Thus each space between adjacent bars is provided with a series of splints. As the conveyer continues to move onward the splints are dipped into the baths, the comb T straightening out any inclined or irregularly placed splints. When the conveyer brings the matches to the guide drum F, the matches are discharged by the teeth $f$ of the drum F which pass into the spaces between the bars B, B and thus expel the matches.

With the conveyer constructed of the bars linked together at their ends it possesses perfect flexibility in a transverse direction and may consequently bend in passing around the guiding drums or pulley, and about the driving and ejecting drums or cylinders. The carrying and driving of the conveyer is therefore greatly facilitated. At the same time the employment of bars having their adjacent surfaces, between which the splints are received, formed round or convex, permits a uniform pressure or bite to be maintained upon the splints so that the bars may have the necessary independent movement in passing around the pulleys or drums without breaking, or bending the match sticks. Thus the flexing of the apron or carrier will not injure the splints carried by it.

It is to be understood that in practice the conveyer shall be of sufficient length to permit the heads of the matches to become thoroughly dried before the matches are expelled by the drum F, and suitable drying devices or compartments may be employed. The guiding drums E, F may be provided with flanges U upon either or both ends to keep the bars of the apron properly centered.

I do not limit myself to any of the details of construction shown as they may be varied without affecting the invention.

What I claim as new, and desire to secure by Letters Patent, is—

1. In a match making machine, the combination of a splint receiving conveyer consisting of a series of independent transversely arranged parallel bars, between which the ends of the splints are received and a toothed splint expelling drum having a series of longitudinal splint expelling teeth adapted to enter the spaces between adjacent bars and free the ends of the matches therefrom.

2. In a match making machine, the combination of a splint receiving conveyer adapted to receive and hold the ends of the match splints, and a comb below the conveyer adapted to act upon the free ends of the splints and to equalize the distance between the free ends while their other ends are held by the conveyer.

3. The splint receiving and conveying apron consisting of the series of independent round bars B arranged at a distance apart sufficient to receive and clamp the ends of the splints and loosely united at their free ends by the links C, D to form a transversely flexible apron or band.

4. In a match making machine, the combination of a conveying apron consisting of a series of transversely arranged independent parallel bars separated a distance apart sufficient to receive and clamp the ends of the splints with their adjacent opposed surfaces of a convex form and connected at their ends to form a transversely flexible apron, and a reciprocating splint feeding cutter arranged adjacent to the apron and adapted to introduce the ends of the splints between the adjacent bars of the apron.

5. In a match making machine, a splint receiving conveyer consisting of a series of transversely arranged round bars linked together at their free ends to form a transversely flexible apron or band adapted to receive the match splints between adjacent bars.

6. In a match making machine, the combination with a rotary drum or cylinder of a transversely flexible splint carrying apron or band consisting of a series of parallel transversly arranged bars united at their ends and having adjacent opposed convex surfaces between which the match splints are received, whereby the pressure of said bars against the splints carried by them will be substantially uniform whether said apron or band is running straight or passing over said drum or cylinder.

7. In a match making machine, a splint carrying apron or band composed of a series of transversely arranged parallel bars united at their ends so as to be movable with respect to one another and having their adjacent opposed faces between which the splints are received of a round or convex form, whereby the flexing of said apron or band will not affect the pressure of said bars upon the splints which they carry.

In testimony of which invention I have hereunto set my hand.

L. H. MONTROSS.

Witnesses:
W. C. PERRIN,
ERNEST HOWARD HUNTER.